Patented Apr. 27, 1943

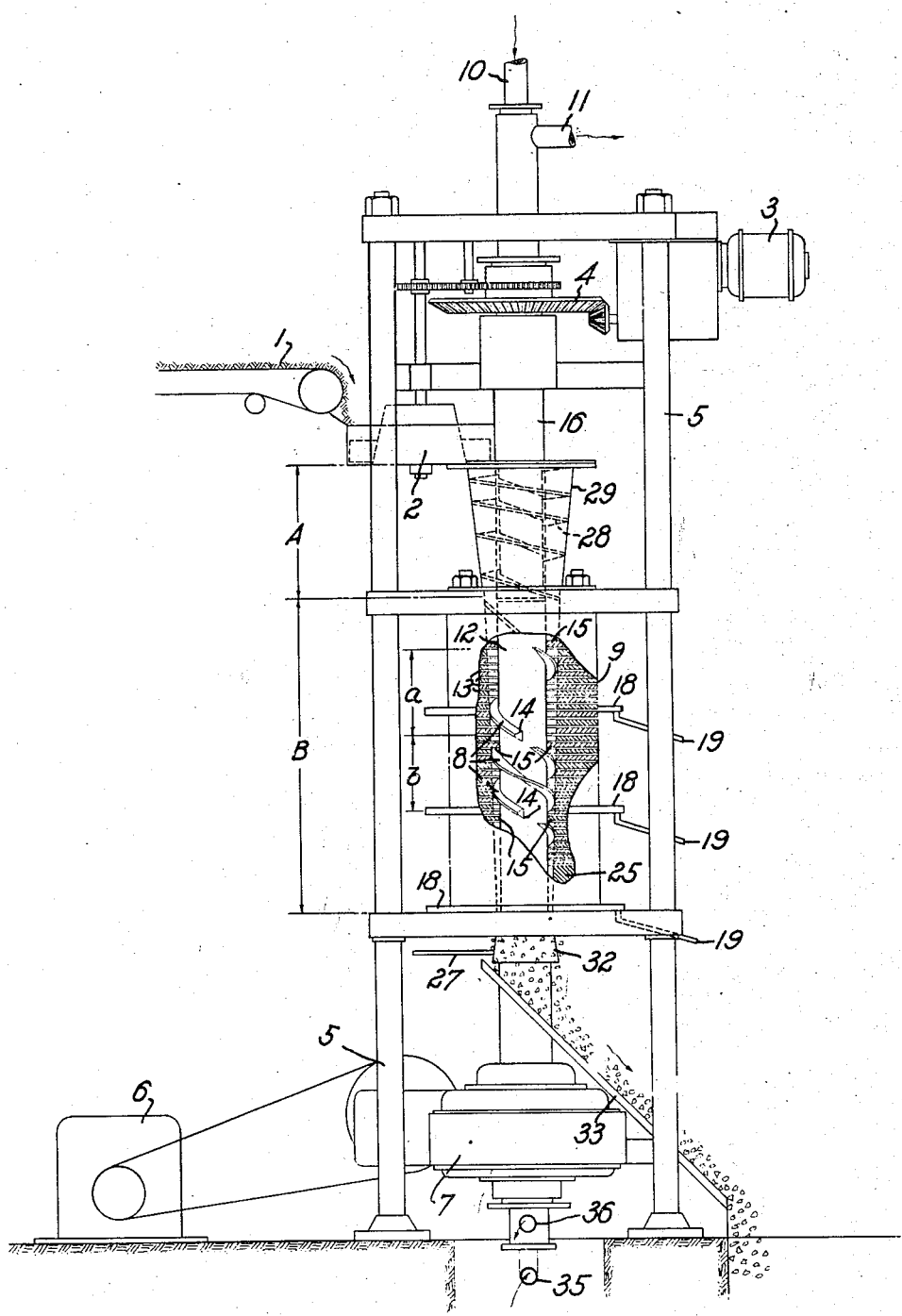

2,317,777

UNITED STATES PATENT OFFICE 2,317,777

APPARATUS FOR THE SEPARATION OF ICE AND CONCENTRATE

Georg Alexander Krause, Hollriegelskreuth, near Munich, Germany; vested in the Alien Property Custodian Original application December 27, 1938, Serial No. 248,014. Divided and this application April 14, 1941, Serial No. 388,526. In Germany December 27, 1937

6 Claims. (Cl. 62—124)

It is known to concentrate solutions, emulsions etc., by freezing out the water and separating the ice and the concentrate. Centrifuging, suction filtration, allowing the concentrate to drip from the ice with subsequent washing, and pressing out the mixture of ice and concentrate have been proposed for separating the concentrate from the ice. Centrifuging is the only one of these methods heretofore found to be practically useful when it is desired to produce ice of relatively high purity. This method, however, involves the disadvantage that, on the one hand, centrifuging is relatively costly and, on the other hand, its output is comparatively small if it is so conducted as to accomplish a practically complete separation of the concentrate from the ice. Separation of ice and concentrate by means of presses has been used only in exceptional cases because of the low purity of the ice produced. The residue of concentrate enclosed in the ice can not be recovered, for instance, by washing after the pressing operation, as in the other separating methods. Since the press cakes produced in other pressing processes, for instance in pressing oils, always retain a considerable portion of the liquid, it being impossible to recover this residue commercially by pressing operations alone, it was not expected that in pressing ice and concentrate, ice practically free from residue could be recovered.

The subject of the present invention is a new apparatus for separating ice and concentrate by a pressing operation which accomplishes a practically complete separation of ice and concentrate. The process described herein is claimed in my application Serial No. 248,014 filed December 27, 1938 now Patent No. 2,241,726.

In accordance with the invention, heat is supplied during the pressing operation in such amount and in such a way that the ice is heated up and a part of it is melted and serves to separate the concentrate from the remainder. The new process is based on the following observations.

In the pressing operation heretofore practiced, for instance in the pressing of oil from plant products, the solid portion is deformed but retains its structure. The pressing operation consequently necessitates a more or less systematic reducing in size of the interstices in which the liquid phase is held, whereby the liquid is expressed. This effect can be increased within wide limits by increasing the amount of pressure.

Entirely different physical operations are involved in separating ice and concentrate by pressing in accordance with the discovery on which the present invention is based. In pressing ice-concentrate mixtures the ice crystals become plastic under the action of the pressure, until they begin to grow together so that finally a unitary block of ice is formed from the many separate crystals. Therefore in order to separate ice and concentrate from each other by pressing, the pressing operation should be carried on by promoting simultaneously two operations, first, the growing together of the crystals which become plastic under pressure must be facilitated as much as possible and second, the concentrate must be led off as rapidly as possible as the ice crystals coalesce.

On the basis of these observations, the following rules for carrying on the separation of ice and concentrate by means of pressing are given:

1. Particles of concentrate that remain in the ice when the pressing operation is incorrectly executed cannot be removed subsequently since due to the growing together of the crystals they are entirely enclosed by compact ice. Washing of the ice and even placing the impure ice under pressure again is useless. In accordance with the invention therefore the washing of the ice must occur simultaneously with the pressing operation. In contrast with the known freezing processes, the present process is not carried on with the exclusion of any addition of heat, but on the contrary a substantial addition of heat is made intentionally during the pressing operation. In this way, simultaneous with the pressing, a heating up of the ice to the melting temperature and a melting of a part of the ice occurs, starting at the boundaries between the crystals and causing a flushing out of the concentrate found in the recesses between the crystals. The heat is supplied preferably in the zone of highest pressure. The heat may be developed from the mechanical work of the pressing operation. If in certain cases the heat developed mechanically should be too great it is compensated by cooling the press.

If it is desired to concentrate an apple juice of 10% by weight dry substance to 25% dry substance by freezing 60 parts of the water out of 100 parts of juice, the ice separated by pressing without partial melting will contain about 1.5% of dry substance. This amounts to a loss of 9% of the dry substance of the juice.

This loss is avoided if a part of the ice is melted during the pressing operation. Therefore instead of freezing 60 parts of ice out of 100 parts of solution, 63–65 parts should be frozen. Then during the pressing operation, this additional 3–5 parts of ice is melted and in this way a concentrate of the desired 25% is produced and in addition ice practically free from solid substance is produced.

The percentage of the amount of ice that must be melted during the pressing operation depends in the first place on the size of grain of the ice. The melted up portion of the ice probably washes off the solution still adhering to the surfaces of the ice. The required amount of washing liquid is therefore dependent on the surface area of the ice. Since the surface area of a certain quantity of ice calculated on the basis of spherical bodies, increases with decreasing diameter of the single crystals, it is obvious that the amount of ice to be melted during the pressing operation must increase proportionately with decreasing size of crystals. In pressing very fine crystalline ice therefore it may be necessary to melt up a relatively large fraction of the ice (up to about 10% or more), in order to produce residue-free ice. In pressing coarse crystalline grains, obtained by slow freezing of dilute solutions the amount of ice to be melted will be smaller.

For the reasons given, therefore, the freezing operation is carried on in such a manner that ice in the form of the largest possible crystals is obtained.

2. The expressing pressure is to be raised above the value at which the ice begins to become plastic only after the bulk of the concentrate has run off or when the content of concentrate in the ice is small. This expedient likewise tends to prevent the concentrate from being enclosed by the ice instead of being expressed.

If it is desired therefore to express an ice-concentrate mixture, about which it has been ascertained, for instance by experiment, that at the prevailing temperatures, the crystals begin to grow together at a pressure of about 10 kg./cm.², the expressing pressure is then raised above the value of 10 kg./cm.² only when the content of concentrate in the ice has fallen below 20% or preferably below 10%. The further increase in pressure, required for recovering ice free from residue amounts in most cases to a multiple of the pressure heretofore ordinarily applied. It is frequently necessary, for instance, to increase the pressure to several hundred kg./cm.² in order to recover ice free from residue by the combined pressing and washing operation, while the bulk of the concentrate can be separated with much lower pressures. In this way, the additional advantage is obtained that the bulk of the concentrate is separated in undiluted form, this being especially important in producing the highest concentrates. Only a portion of the concentrate is diluted by the water produced during melting of a part of the ice in the last part of the pressing operation. This portion is collected separately and may be returned again to the concentrating process.

3. The discharge openings for the concentrate are to be given dimensions such that the ice because of its plasticity at the pressure under which it is placed will not pass through the openings. In order to be able to use high pressures, without it being necessary to make the discharge openings too small, the place of the highest pressure is kept at a distance from the discharge openings. In this way, the additional advantage is assured that the concentrate expressed in the zone of highest pressure will flow off through a zone of lower pressure and thus serve as washing liquid.

4. In order to avoid the enclosing of concentrate by ice particles growing together, the pressure should not be increased more rapidly than corresponds to the discharge of the concentrate. In the treatment of thin layers of the ice-concentrate mixture therefore, in which the concentrate has short discharge paths, the expressing pressure can be raised comparatively rapidly, while in treating thicker layers, the increase in pressure must occur much more slowly.

5. The ice is heated up as near as possible to 0° especially when only a small amount of concentrate is still present. Since the pressure at which the ice becomes plastic increases greatly with decreasing temperature, slight expressing pressures can be used when the temperature is near 0° C.

6. In case the ice to be expressed is to be cooled externally, cold can be supplied only to the places of relatively high pressure and never to the places where the concentrate emerges from the material being pressed. Otherwise, the concentrate flowing out from the places of higher pressure to the places of lower pressure would freeze again. Non-observance of this requirement might lead to the difficulty heretofore encountered in carrying on expressing processes, in which, in order to avoid losses by melting, the press baskets have generally been cooled externally at the places where the concentrate flowed off and thereby the flowing off of the concentrate was retarded or prevented.

7. Since the growing together of the ice crystals occurs most easily between crystal surfaces which are alike in the crystallographic sense the pressing operation is simplified and accelerated by a proper arrangement of the ice crystals. A satisfactory arrangement of crystals can be produced for instance by freezing with definite direction of the temperature gradient, e. g., by freezing the solutions in annular cells.

8. In case crystals of irregular distribution must be treated, the growing together of the crystals can be accelerated by agitating the material being pressed, mixing it up or subjecting it to a fulling operation. This effect probably depends on the fact that the movement of the material being pressed facilitates and accelerates the adjustment of orientation of the crystals and the heat distribution.

It is not necessary that the above described expedients should all be employed simultaneously in order to obtain a satisfactory result. On the contrary the omission of certain of these expedients can be compensated for by an increased use of others.

If it is desired to use a screw press for the pressing operation the following conditions must be observed.

A. In accordance with the invention the pressure along the path of movement of the ice must not increase constantly but must increase considerably more towards the end of the screw. According to this requirement the volume of the expressing chamber decreases along the axis of the screw, taking into account the decrease in volume of the material being pressed. The change in the pressing space in the lengthwise direction of the axis of the press can be provided for by changing the radial dimension of the space, e. g., by increasing the diameter of the screw shaft or by narrowing the strainer housing or by lessening the distance between the separate screw turns.

The means for collecting the concentrate is so arranged that the concentrate that runs off in the first part of the pressing operation at comparatively low pressures and without much melting of ice can be collected separately. The rest of the concentrate which runs off from the zone of highest pressure with greater melting of ice and is therefore diluted, can be collected separately also.

B. The most satisfactory speed of the press is regulated in the following way according to points 2 and 4 above.

As long as the concentrate can run off during the pressing operation rapidly and completely, the amount of concentrate running from a definite point of the press is approximately proportional to the amount of the ice-concentrate mixture treated. By a few orienting experiments it can be ascertained easily when, in increasing the press speed, the limit is passed at which the expressing pressure increases so rapidly that the discharge of the concentrate is being interfered with. In accordance with the invention, the pressing is carried on as closely as possible below this limit since the highest possible output of the press is thus obtained.

C. According to point 3 above the dimensions of the outlet openings of the screen should not exceed 0.5 mm., which is considerably less than the dimensions of outlet openings usual heretofore. In the zone of higher pressure, i. e., towards the end of the screen, the distance between the screen bars is preferably reduced to below 0.2 mm. The high pressure end of the press can even be entirely closed under certain circumstances. The part of the concentrate expressed there is then forced with the melted ice against the flow of the ice and flows through a zone of lower pressure as washing liquid until it reaches the outlet openings.

D. The spiral blade of the screw preferably is given a trapezoidal cross-section the base of the trapezoid resting on the shaft. In this way, the expressing chamber is given a cross-section diminishing with the distance from the outlet openings, the place of highest pressure being located in the neighborhood of the axis and thus removed from the points at which the concentrate flows off.

E. If the normal expressing work is not sufficient for producing the heat necessary for melting up a part of the ice, according to point 1 of the invention, the fulling and kneading action on the ice-concentrate mixture, connected with the expressing operation can be increased by suitable construction of the screw. The screw can be constructed as a double screw, for instance. Another possibility of increasing the work on the mixture consists in placing baffles in the path of the ice moved along by the screw.

F. In general, with reference to the melting of a part of the ice necessary during the expressing operation, a special cooling of the press is not necessary in continuous operation. Occasionally even a certain heating up of the press may be necessary. In a few cases, especially in treating ice that has been separated from concentrated solutions at temperatures far below 0°, cooling of the press is necessary. Cooling or heating of the press is provided preferably in the neighborhood of the places of relatively highest pressure in the press, and the press is therefore cooled or heated primarily from the shaft of the screw.

In recovering high concentrates, it may even be necessary to cool the press for instance in the first part in order to prevent any dilution by melting up of ice during the flowing off of the highest concentrate; while the last part of the press is given additional heat in order on the one hand to attain the plasticity limit of the ice according to point 5 above at the lowest possible pressures and on the other hand to carry on the melting up and heating necessary for producing ice free from residue.

The execution of the process is described in the foregoing by way of example in a screw press, since a continuously operating press is of the greatest importance technically. The process, however, can be carried out in any of the familiar types of presses. If the process is to be carried out in a pack or plunger press, the place of outlet for the concentrate is kept as far as possible from the place where the pressure is applied. The pressing table and plunger moreover are preferably given a shape that causes a fulling or kneading of the ice during the pressing operation; for instance, they are constructed in corrugated form.

Intermittently operating presses of this kind are especially suitable for treating ice of regular formation. In this case, it is not necessary to give the press table and plunger a special shape.

Apparatus embodying my invention and suitable for carrying out the process described above is illustrated in the accompanying drawing which is a front elevation partly in section of the apparatus.

Referring to the drawing, 12 and 16 are cylindrical vertically disposed aligned shafts. Shaft 16 is surrounded in the region A by the frusto-conical chamber wall 29 and shaft 12 is surrounded in region B by the downwardly slightly tapered wall 9. The wall 29 is without openings and is not designed to withstand heavy pressures since it merely serves to feed the mixture of ice and concentrate into the space between the shaft 12 and the wall 9 where the high pressure treatment takes place. The wall 9 is made up of spaced rings providing annular slots 13 between them for the discharge of concentrate. The spacing between the rings is, as stated under C above, not to exceed about 0.5 mm. The screw 28 is a simple feeding worm formed of sheet material, e. g., sheet metal of uniform thickness and of sufficient strength to move the mixture of ice and concentrate downwardly in the chamber formed by the wall 29. The screw 8 in the region B is, as appears at 14, trapezoidal in cross-section with the longer base of the trapezoid adjacent the shaft 12. As is illustrated, a portion of the screw 8 within the section (a) consists of a single thread while within the section (b) it consists of a double thread as pointed out under E above. 15, 15 are baffles or scrapers for preventing movement of the ice with the rotating shaft 12 and for breaking up the compacted ice which is being moved downwardly in the space between the shaft 12 and the wall 9 by the action of the screw 8. 19, 19 are spouts leading from suitable pans 18, 18, for collecting and carrying off concentrate expelled through the openings 13 in wall 9. As shown at 25 the lower end of the wall 9 may be imperforate so as to create a high pressure region and force the expelled concentrate and liquid produced from the melted ice upwardly through and counter-current to the movement of the ice until it reaches openings 13 immediately above this imperforate region. The ice is finally discharged from the space formed between the wall 9 and the shaft 12 through an annular orifice between the lower end of the wall 9 and the tapered plug 32 which is adjustable by means of the lever 27. The ice discharges through the trough or chute 33.

The shaft 12 is rotated by the motor 6 and suitable gearing within the housing 7. Pipes 35 and 36 are inlet and outlet respectively for heating fluid for heating the lower end of the shaft and the ice in contact with it.

The conveyor belt 1 and the distributing device 2 serve to provide a uniform feed of the ice-concentrate mixture to the screw 28 within the chamber formed by the wall 29. The motor 3 and gearing 4 serve to drive feeding mechanism and the screw 28. 10 and 11 are inlet and outlet respectively for cooling fluid to the shaft 16. The apparatus described is supported by a suitable structure or frame 5. It will be observed that the space between the shaft 12 and the wall 9 decreases downwardly. The rate of decrease in this space as well as the depth or thickness at its lower or higher compression end depend upon the particular mixture of ice and concentrate under treatment and also upon the speed of rotation of the compressing screw. It may be said, however, that the space at the high pressure end of the compression chamber has been found in practice to vary from a few centimeters thickness to many times this figure.

This application is a division of my application Serial No. 248,014, filed December 27, 1938, now Patent No. 2,241,726.

I claim:

1. Apparatus for the separation of ice and concentrate from a mixture thereof comprising a receptacle, means for applying pressure to the mixture in said receptacle adapted to apply different pressures to the mixture in different portions of the receptacle, said receptacle being provided with openings for the expulsion of liquid, the openings in the region of highest pressure having a width not exceeding 0.2 mm.

2. Apparatus for the separation of ice and concentrate from a mixture thereof comprising a receptacle for the mixture provided with openings for the expulsion of liquid, and a screw within said receptacle for applying pressure to the mixture, said screw comprising a central shaft and a helical blade of trapezoidal cross-section with the base of the trapezoid adjacent the shaft.

3. Apparatus for the separation of ice and concentrate from a mixture thereof comprising a receptacle for the mixture provided with openings for the expulsion of liquid, a screw within said receptacle for applying pressure to the mixture, said screw comprising a central shaft and a helical blade and stationary baffles in the path of the mixture as it is moved by the screw.

4. Apparatus for the separation of ice and concentrate from a mixture thereof comprising a receptacle for the mixture provided with openings for the expulsion of liquid, a screw within said receptacle for applying pressure to the mixture, said screw comprising a central shaft and a helical blade and means for cooling said shaft.

5. Apparatus for the separation of ice and concentrate from a mixture thereof comprising a chamber for the mixture provided with openings for the expulsion of liquid from the mixture, a shaft rotating within said chamber, the space between the wall of the chamber and said shaft decreasing from one end to the other, a single screw carried by the shaft for moving the mixture toward the smaller end of said space, and a double screw carried by the shaft adjacent said smaller end.

6. Apparatus for the separation of ice and concentrate from a mixture thereof comprising a chamber for said mixture, a shaft extending through and rotatable within said chamber, a screw carried by said shaft for forcing the mixture through the space between the shaft and chamber wall, means for cooling the mixture at the low pressure end and for heating the mixture at the high pressure end of the chamber.

GEORG ALEXANDER KRAUSE.